(12) United States Patent
Koyama

(10) Patent No.: US 8,650,872 B2
(45) Date of Patent: Feb. 18, 2014

(54) CONTROL UNIT OF HYDRAULIC BRAKE APPARATUS FOR VEHICLE

(75) Inventor: Fumitoshi Koyama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 879 days.

(21) Appl. No.: 12/842,343

(22) Filed: Jul. 23, 2010

(65) Prior Publication Data

US 2011/0047999 A1    Mar. 3, 2011

(30) Foreign Application Priority Data

Aug. 27, 2009   (JP) .................................. 2009-196427

(51) Int. Cl.
*F15B 7/00* (2006.01)

(52) U.S. Cl.
USPC .............................. 60/545; 60/591; 303/119.3

(58) Field of Classification Search
USPC .............. 60/591, 545, 533; 303/119.2, 119.3; 137/884
See application file for complete search history.

(56) References Cited

U.S. PATENT DOCUMENTS

| | | | |
|---|---|---|---|
| 5,634,695 A * | 6/1997 | Ohta et al. ....................... | 303/10 |
| 6,234,199 B1 * | 5/2001 | Nohira .......................... | 137/557 |
| 6,270,170 B1 * | 8/2001 | Isogai et al. .............. | 303/119.3 |
| 6,295,832 B1 | 10/2001 | Kato et al. | |
| 6,318,818 B1 * | 11/2001 | Brachert et al. ........... | 303/119.2 |
| 6,443,537 B2 * | 9/2002 | Koyama .................... | 303/119.3 |
| 7,350,882 B2 | 4/2008 | Kamiya et al. | |
| 7,448,698 B2 * | 11/2008 | Koyama .......................... | 303/10 |
| 7,753,456 B2 * | 7/2010 | Iyatani ....................... | 303/119.3 |
| 8,020,946 B2 * | 9/2011 | Iyatani ....................... | 303/119.1 |
| 2009/0072615 A1 | 3/2009 | Oosawa et al. | |

FOREIGN PATENT DOCUMENTS

| | | |
|---|---|---|
| DE | 10 2005 010 910 A1 | 10/2005 |
| DE | 10 2008 046 993 A1 | 4/2009 |
| JP | 10-194113 A | 7/1998 |
| JP | 11-101532 A | 4/1999 |
| JP | 11-147227 A | 6/1999 |
| JP | 11-208440 A | 8/1999 |
| JP | 2000-203405 A | 7/2000 |
| JP | 2004-075052 A | 3/2004 |
| JP | 2005-145239 A | 6/2005 |
| JP | 2005-255168 A | 9/2005 |

OTHER PUBLICATIONS

JP11208440—English machine translation, original JP document with partial translation from applicant.*

(Continued)

*Primary Examiner* — Edward Look
*Assistant Examiner* — Michael Quandt
(74) *Attorney, Agent, or Firm* — Buchanan Ingersoll & Rooney PC

(57) ABSTRACT

A control unit of a hydraulic brake apparatus for a vehicle including a housing, a switching control valve, pressure increase control valves, pressure decrease control valves, a reservoir, a pump driven by a motor, a first passage, a second passage, an inner bore and a passage forming member being liquid-tightly fitted into the inner bore in order to form an extended ring-shaped passage, wherein the extended ring-shaped passage forms a part of the first passage, and the switching control valve, the pressure increase control valves and the outlet valve are connected to the extended ring-shaped passage, and a part of the second passage is formed within the passage forming member, and end portions of the part of the second passage are connected to the switching control valve and the switching valve.

8 Claims, 6 Drawing Sheets

(56) References Cited

OTHER PUBLICATIONS

Office Action (Reasons) dated May 28, 2013, issued by the Japanese Patent Office in the corresponding Japanese Patent Application No. 2009-196427, and an English translation of the Office Action. (6 pages).

Office Action dated May 10, 2013, issued by the German Patent Office in the corresponding German Patent Application No. 10 2010 039 617.6, and an English translation of the Office Action. (9 pages).

\* cited by examiner

CONTROL UNIT OF HYDRAULIC BRAKE APPARATUS FOR VEHICLE

CROSS REFERENCE TO RELATED APPLICATIONS

This application is based on and claims priority under 35 U.S.C. §119 to Japanese Patent Application 2009-196427, filed on Aug. 27, 2009, the entire content of which is incorporated herein by reference.

TECHNICAL FIELD

This disclosure relates to a control unit of a hydraulic brake apparatus for a vehicle by which a brake hydraulic pressure is automatically applied to a wheel cylinder upon an antiskid control, a side slide control (e.g., an electronic stability control), a traction control or the like.

BACKGROUND DISCUSSION

As an example of a control unit of the hydraulic brake apparatus that automatically applies a hydraulic pressure to the wheel cylinder, a control unit having a housing in which bores for housing control valves, communicating passages for the control valves and the like are integrally formed, for example a control unit disclosed in JPH11-208440A, has been known.

In view of space efficiency in the control unit and connection efficiency of a conduit connected to the outside of the housing, such control unit has a structure in which a master cylinder port and a wheel cylinder port are arranged at an upper portion of the housing, a reservoir is arranged at a lower portion of the housing, and a pump, control valves, and outlet valves and the like are arranged at an intermediate portion of the housing. The outlet valve indicates a check valve used for preventing the brake fluid sucked by the pump from the reservoir from being flowing in an opposite direction. Within the housing, plural communicating passages forming a brake fluid circuit indicated in JPH11-28440A (illustrated in FIG. 4) are formed.

There is a need for downsizing and reducing a weight of the control unit of the hydraulic brake for the vehicle, however, as disclosed in JPH11-28440A (illustrated in FIG. 1), because the control valves are arranged above the pump in a two layered formation, a height of the housing may be reduced to some limited extents.

In order to achieve the space efficiency, in a case where a rotary pump is used, the control valves may be arranged so as to be along an outer circumferential surface of the rotary pump. In this configuration, however, the communicating passages for connecting the control valves may be interfere with each other so that the structure of the brake circuit may become complex. Such interferences of the communicating passages may be avoidable by providing a large sized housing, which is oppose the abovementioned need for downsizing the control unit. Thus, the interferences of the communicating passages have been an obstacle for achieving the downsizing of the control unit of the hydraulic brake for the vehicle.

A need thus exists for a control unit of a hydraulic brake for a vehicle, which is not susceptible to the drawback mentioned above.

SUMMARY

According to an aspect of this disclosure, a control unit of a hydraulic brake apparatus for a vehicle including a housing provided between a master cylinder and a plurality of wheel cylinders; the control unit includes, within the housing, a switching control valve provided at a first passage connected to the master cylinder, pressure increase control valves, one of which provided in one passage branched from the first passage, and the other of which provided in the other passage branched from the first passage, pressure decrease control valves, one of which connected to one of the pressure increase control valves at the side of the wheel cylinders and the other of which connected to the other of the pressure increase control valves at the side of the wheel cylinders, a reservoir connected to the pressure decrease control valves, a pump driven by a motor so as to suck a brake fluid from the reservoir and to discharge the brake fluid by way of an outlet valve to a portion between the switching control valve and the pressure increase control valves, a second passage arranged in such a way that one end of the second passage is connected to the switching control valve at the side of the master cylinder and the other end of the second passage is connected to the reservoir, the second passage being controlled so as to be communicated or interrupted by means of a switching valve, an inner bore formed within the housing and a passage forming member being liquid-tightly fitted into the inner bore at both end portions of the passage forming member in order to form an extended ring-shaped passage between an outer circumferential surface of the passage forming member and an inner circumferential surface of the inner bore and between both end portions of the passage forming member, wherein the extended ring-shaped passage forms a part of the first passage, and each of the switching control valve, the pressure increase control valves and the outlet valve is connected to the extended ring-shaped passage, and a part of the second passage is formed within the passage forming member, and one end portion of the part of the second passage formed within the passage forming member is connected to the switching control valve at the side of the master cylinder, and the other end portion of the part of the second passage formed within the passage forming member is connected to the switching valve.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A control unit B of a hydraulic brake apparatus for vehicle of an embodiment related to this disclosure will be explained in accordance with the attached drawings. The control unit B includes a first conduit system for controlling a brake hydraulic pressure applied to a front-left wheel and a rear-right wheel and a second conduit system for controlling a brake hydraulic pressure applied to a front-right wheel and a rear-left wheel. Because a configuration of the first conduit system is similar to that of the second conduit system, only the configuration of the first conduit system will be explained, and an explanation of the second conduit system will be omitted.

Figure 1:
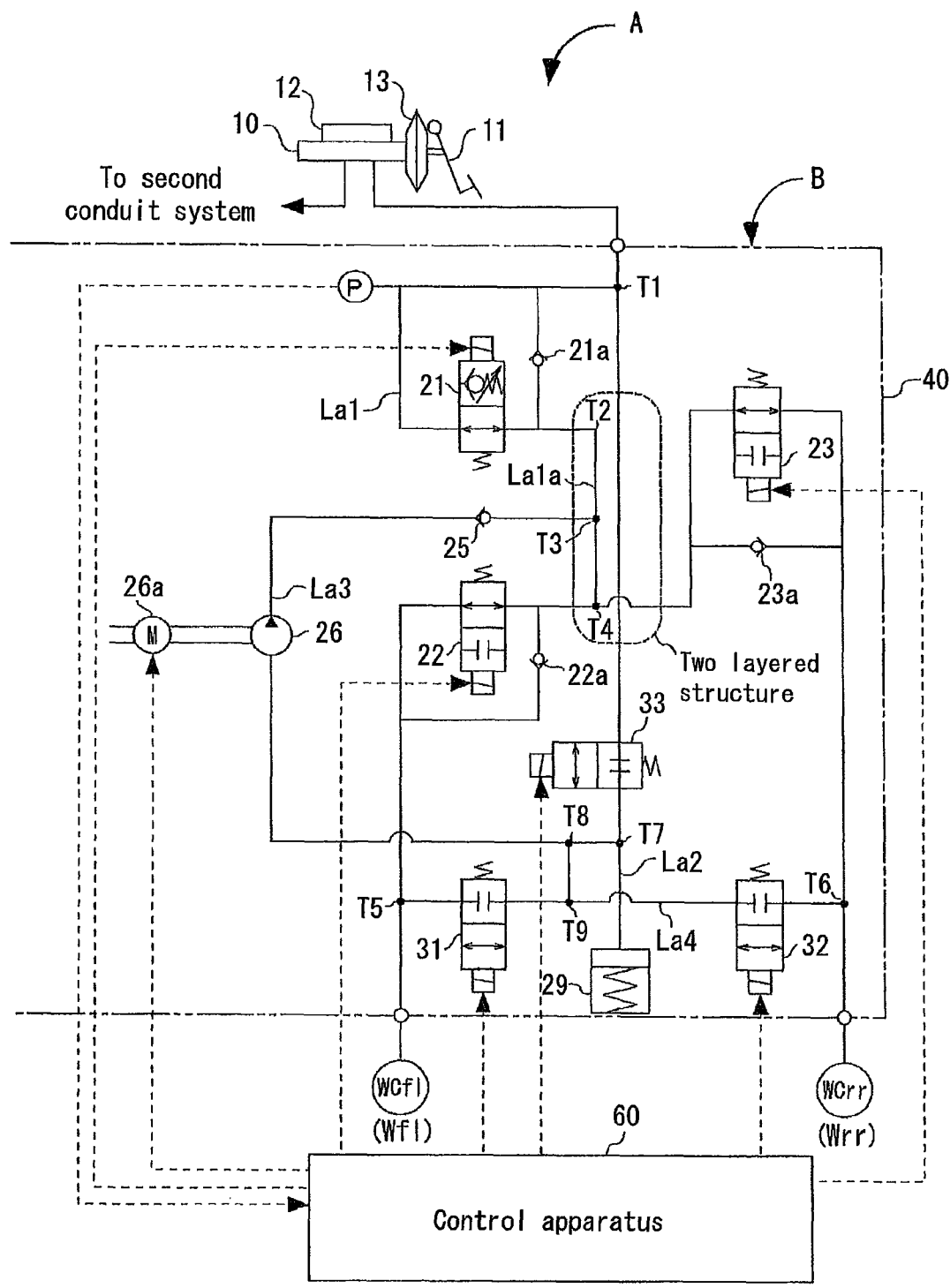
FIG. 1 is a circuit diagram indicating an entire structure of hydraulic brake apparatus for vehicle, including a control unit, related to an embodiment related to this disclosure.

First, an entire configuration of a hydraulic brake apparatus for a vehicle A having the control unit B will be explained in accordance with FIG. 1. The hydraulic brake for the vehicle A is configured by a master cylinder 10, wheel cylinders WCfl and WCrr, a control apparatus 60 and the control unit B. The control unit B is configured by a housing 40, first, second, third and fourth passages La1 through La4, each of which is formed within the housing 40, a switching control valve 21, pressure increase control valves 22 and 23, pressure decrease control valves 31 and 32, a reservoir 29, a rotary pump 26, an outlet valve 25, a switching valve 33 and the like.

When a brake pedal 11 is depressed by a driver, the master cylinder 10 is operated so as to output brake fluid, corresponding to a depression level of the brake pedal 11, to the firsts passage La1 via a negative pressure booster 13 by which the depressing force applied to the brake pedal 11 is boosted. The master cylinder 10 includes a reservoir tank 12 in which the brake fluid is reserved. When the hydraulic pressure is applied to the wheel cylinders WCfl and WCrr by the master cylinder 10, each of the wheel cylinders WCfl and WCrr applies the hydraulic pressure to each wheel so as to press a brake pad of a disc brake so that a braking force is applied to the wheel.

The housing 40 includes a housing bore, in which fluid pressure instruments such as the control valves and the first through fourth passages La1 through La4 are housed. An arrangement of the housing bore and a two layered structure of the passages are main characteristics of this disclosure. Relations and functions of each passages and each fluid pressure instrument will be explained first, and the housing will be explained later.

The first passage La1 is arranged in such a way that one end thereof is connected to the master cylinder 10 and the other end thereof is connected to the wheel cylinders WCfl and WCrr. Specifically, at the other end of the first passage La1, the first passage La1 passes points T2 and T3 and branches at a point T4 in two passages (e.g., branched passages), one passage being eventually connected to the wheel cylinder WCfl and the other passage being eventually connected to the wheel cylinder WCrr. In the first passage La1, the switching control valve 21 is provided between the master cylinder 10 and the point T4. The pressure increase control valve 22 is provided between the point T4 and the wheel cylinder WCfl, and the pressure increase control valve 23 is provided between the point T4 and the wheel cylinder WCrr. Further, a pressure sensor P is provided in the first passage La1 in order to detect the brake hydraulic pressure of the master cylinder 10, and a signal indicating pressure the master cylinder 10 detected by the pressure sensor P is sent to the control apparatus 60.

The switching control valve 21 is a normally open type electromagnetic control valve operated so as to communicate the master cylinder 10 with the wheel cylinders WCfl and WCrr or to control the hydraulic pressure from the master cylinder 10 to the wheel cylinders WCfl and WCrr.

When the switching control valve 21 is changed to be a hydraulic pressure control state, the hydraulic pressure within each of the wheel cylinders WCfl and WCrr is maintained at a level that is higher than a hydraulic pressure within the master cylinder 10 by a predetermined pressure difference. This pressure difference is controlled by means of a controlling current under a command from the control apparatus 60. The switching control valve 21 includes a check valve 21a arranged so as to be parallel thereto in order to allow a flow of the brake fluid (hydraulic pressure) from the master cylinder 10 to the wheel cylinders WCfl and WCrr. The pressure increase control valves 22 and 23 is a normally open type electromagnetic control valve operated so as to communicate the master cylinder 10 with the wheel cylinders WCfl and WCrr or to interrupt the communication between the master cylinder 10 and the wheel cylinders WCfl and WCrr. The pressure increase control valves 22 and 23 are controlled under a command from the control apparatus 60. The pressure increase control valve 22 includes a check valve 22a arranged so as to be parallel thereto in order to allow the flow of the brake fluid (hydraulic pressure) from the wheel cylinder WCfl to the master cylinder 10. The pressure increase control valve 23 includes a check valve 23a arranged so as to be parallel thereto in order to allow the flow of the brake fluid (hydraulic pressure) from the wheel cylinder WCrr to the master cylinder 10.

The second passage La2 is arranged in such a way that one end thereof is connected to the point T1 that is set between the master cylinder 10 and the switching control valve 21 on the first passage La1, and the other end thereof is connected to the reservoir 29 via the switching valve 33. The switching valve 33 is a normally closed type electromagnetic valve operated so as to communicate the master cylinder 10 with the reservoir 29 or to interrupt the communication between the master cylinder 10 and the reservoir 29. The switching valve 33 is controlled under a command from the control apparatus 60.

The third passage La3 is arranged in such a way that one end thereof is connected to a point T7 that is set between the switching valve 33 and the reservoir 29 on the second passage La2, and the other end thereof is connected to the point T3 that is set between the switching control valve and the pressure increase control valves 22 and 23 on the first passage La1.

In the third passage La3, the rotary pump 26 and the outlet valve 25 (check valve) are provided in such a way that the rotary pump 26 is positioned closer to the point T7. The rotary pump 26 is an internal gear type rotatable pump such as a trochoid pump and is actuated by a drive of an electric motor 26a operated under a command from the control apparatus 60. The outlet valve 25 is a check valve for allowing the flow of the brake fluid from the rotary pump 26 and not allowing a flow in an opposite direction of the brake fluid to the rotary pump 26.

The fourth passage La4 is arranged in such a way that one end thereof is connected to a point T8 set between the point T7 and the rotary pump 26 on the third passage La3 and the other end thereof branches at a point T9 in two passages, one passage being connected to the point T5 and the other passage being connected to the point T6, the point T5 being set between the pressure increase control valve 22 on the first passage La1 and the wheel cylinder WCfl, and the point T6 being set between the pressure increase control valve 23 on the first passage La1 and the wheel cylinder WCrr.

The pressure decrease control valves 31 and 32 are normally close type electromagnetic valves, and the pressure decrease control valve 31 is provided on the fourth passage La4 between the point T9 and the point T5, and the pressure decrease control valve 32 is provided on the fourth passage La4 between the point T9 and the point T6. Specifically, the pressure decrease control valve 31 is operated so as to communicate the wheel cylinder WCfl with the reservoir 29 or to interrupt the communication between the wheel cylinder WCfl and the reservoir 29, and the pressure decrease control valve 32 is operated so as to communicate the wheel cylinder WCrr with the reservoir 29 or to interrupt the communication between the wheel cylinder WCrr and the reservoir 29. The pressure decrease control valves 31 and 32 are controlled under a command of the control apparatus 60.

Figure 2:
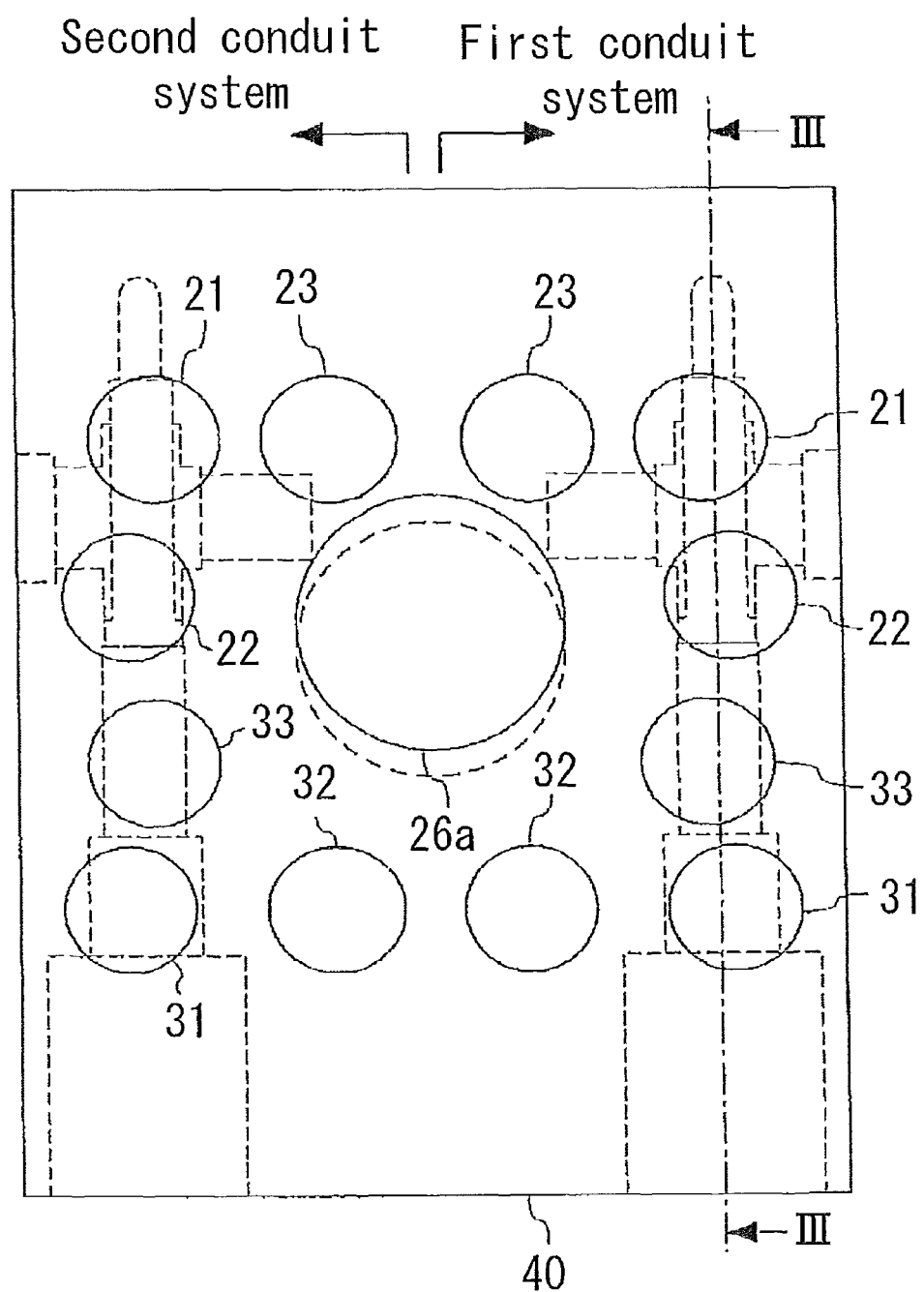
FIG. 2 is a front view schematically indicating a configuration of the control unit of the hydraulic brake apparatus of the embodiment related to this disclosure.
Figure 3:
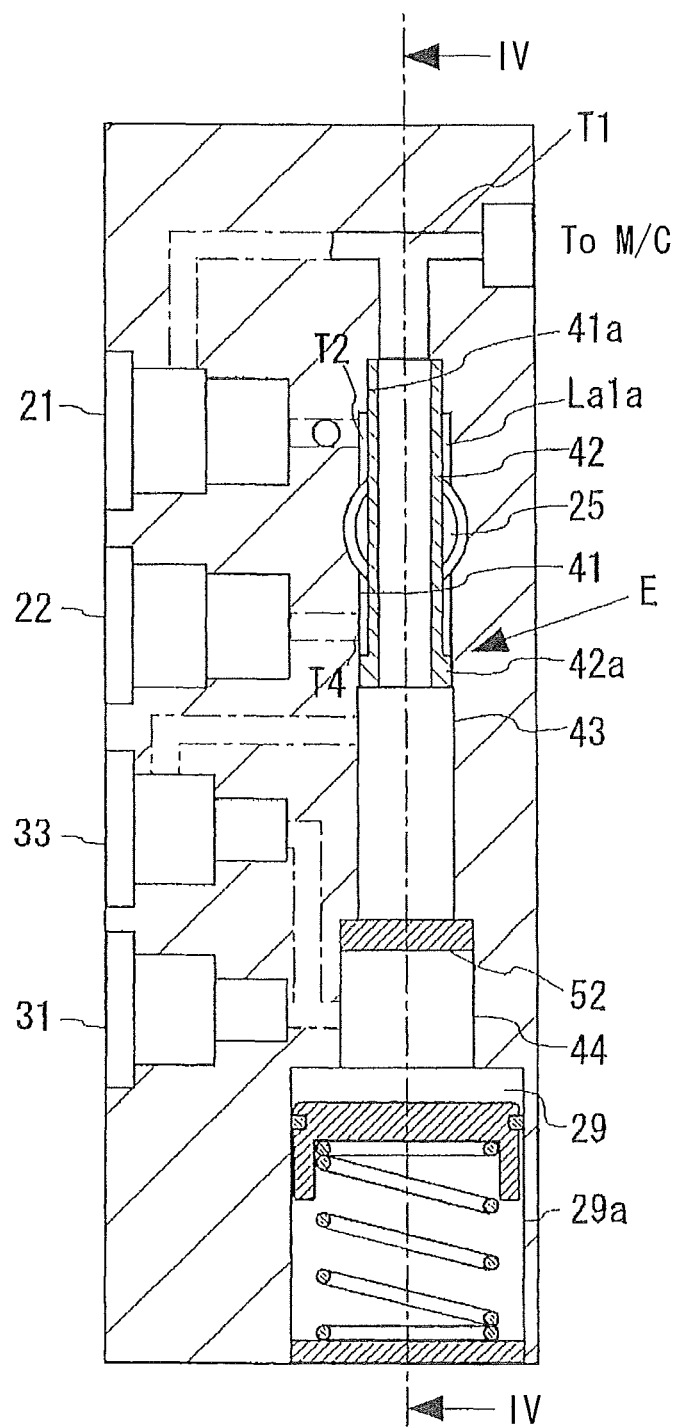
FIG. 3 is a cross section taken along III-III line in FIG. 2.
Figure 4:
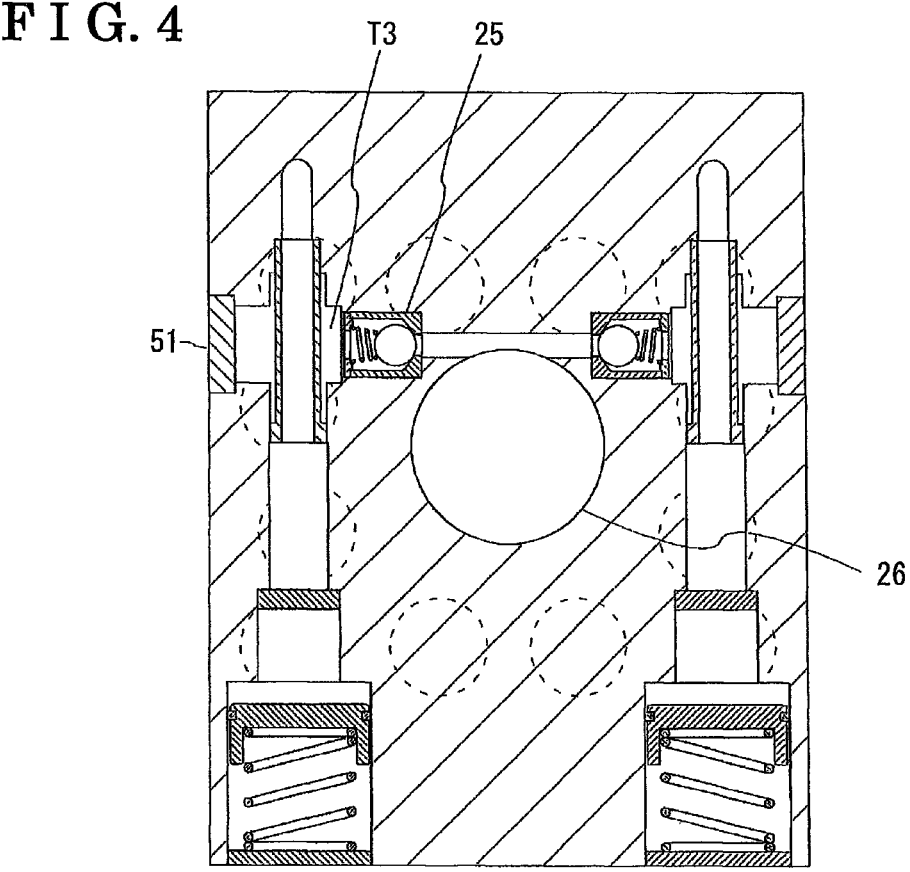
FIG. 4 is a cross section taken along IV-IV line in FIG. 3.

The housing 40 will be explained in detail in accordance with FIGS. 2 through 6. The housing 40 is made of a flexible material such as an aluminum alloy and formed in an approximately cuboid shape. The housing 40 is configured by first and second conduit systems, and as illustrated in FIGS. 2 and 4, each of the systems has an identical configuration except being arranged in symmetrical each other in a right-left direction in FIG. 2. Because of such symmetrical structure, a detail explanation of the second conduit system, except the positional relations among the control valves 21, 22, 23, 31 and 32 and the switching valve 33, will be omitted.

As indicated in a front view of the housing 40 illustrated in FIG. 2 (e.g., a first surface of the housing), the pressure increase control valve 23 of the first conduit system is provided above the rotary pump 26, the pressure increase control valve 23 and the switching control valve 21 of the first conduit system are arranged below an upper end of the housing 40 and above the rotary pump 26, the pressure decrease control valve 32 of the first conduit system is provided below the rotary pump 26, the pressure decrease control valves 32 and 31 are arranged below the rotary pump 26 and above a lower end of the housing 40, the pressure increase control valve 22 of the first conduit system and the switching valve 33 are provided between the switching control valve 21 and the pressure decrease control valve 31 in the vertical direction in FIG. 2 and are provided between the rotary pump 26 and a right end of the housing 40 in the horizontal direction in FIG. 2. The control valves 21, 22, 23, 31 and 32 and the switching valve 33 in the second conduit system are arranged so as to be symmetrical in the right-left direction (horizontal direction in FIG. 2) to those of the first conduit system.

Thus, because the pressure decrease control valves 31 and 32 are arranged at a portion below the rotary pump 26 within the housing 40, the pressure increase control valves 23 and the switching control valves 21 are aligned so as to form one layer, which leads to a downsizing of the housing in a height direction thereof (in the vertical direction in FIG. 2). Further, because the switching valve 33 is provided between one end of a passage forming member 42 at the side of the reservoir 29 and the reservoir 29, the length of the second passage may be shortened, accordingly a space efficiency of the housing 40 may further be achieved. Furthermore, the housing bore is formed at an approximate center of the housing 40 so as to extend from a front surface to the rear surface of the housing 40, and the rotary pump 26 is housed within the housing bore.

Next, the two layered structure of the passage will be explained. A plurality of bores configuring the first passages La1 through the fourth passages La4 are formed within the housing 40. Each bores are formed so as to distant from each other so that predetermined thicknesses are maintained therebetween.

The first passage La1 and the second passage La2 are partially overlapping each other, thereby configuring the two layered structure. Specifically, between the rotary pump 26 and the right side surface of the housing 40 in the front view, a reservoir bore 29a, a reservoir-switching valve communicating bore 44, a passage forming member-switching valve communicating bore 43 and an inner bore 41 are formed so as to have an identical axis from the bottom of the housing 40 in the above mentioned order. The reservoir-switching valve communicating bore 44 is formed so as to communicate the reservoir 29 with the switching valve 33, and the passage forming member-switching valve communicating bore 43 is formed so as to communicate an inner passage of the passage forming member 42 with the switching valve 33. According to such structure, a process for forming the bores may be simplified, thereby reducing the manufacturing costs. The communication between the passage forming member-switching valve communicating bore 43 and the reservoir-switching valve communicating bore 44 is closed by means of a plug 52.

Within the inner bore 41, the passage forming member 42 is inserted and fits at both end portions of the passage forming member 42, thereby forming the two layered structure of the passage. Specifically, the inner bore 41 is formed so as to have a small diameter bore portion 41a at one end portion that is distant from the reservoir 29. The passage forming member 42 is made of a hard material such as carbon steel and is formed so as to have a large diameter portion 42a at one end thereof. Triangle-shaped protrusions 42b (e.g., protrusions) are circularly formed on an outer circumferential surface of the large diameter portion 42a of the passage forming member 42.

Figure 5:
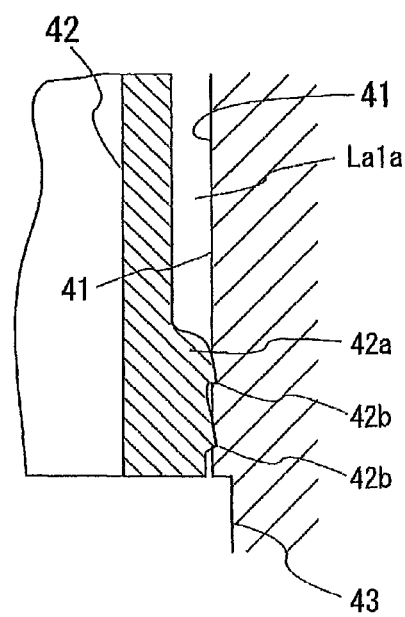
FIG. 5 is an enlarged diagram of a portion indicated by an arrow E in FIG. 3.
Figure 6:
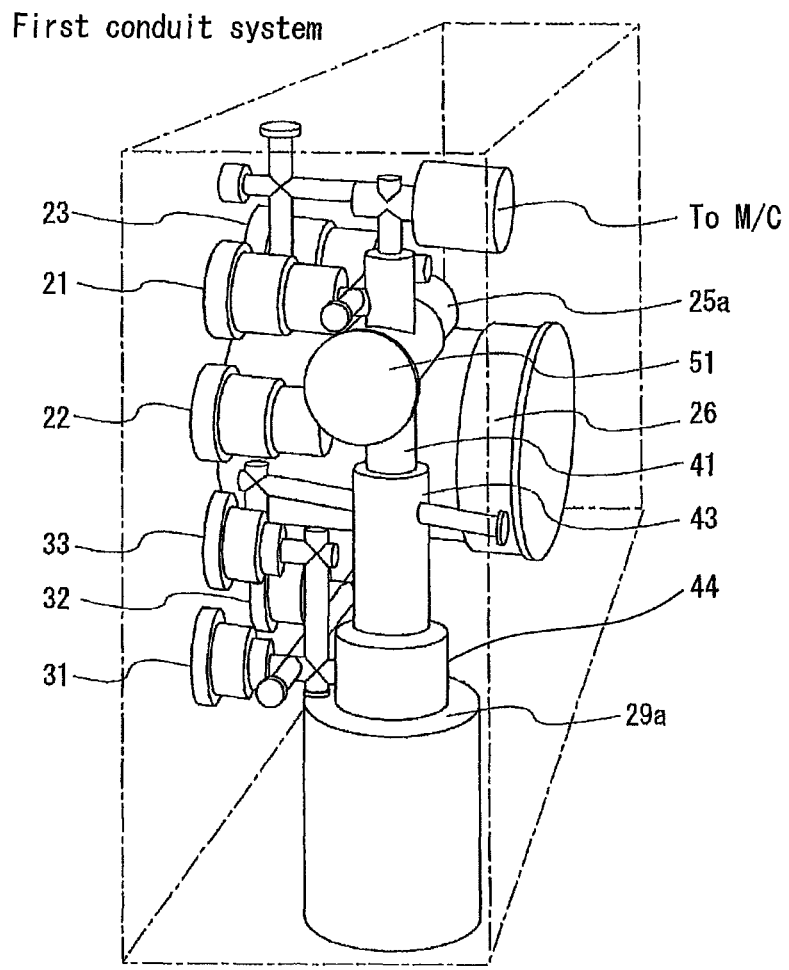
FIG. 6 is a perspective view schematically indicating an internal structure of the control unit of the hydraulic brake apparatus of the embodiment related to this disclosure.
Figure 7:
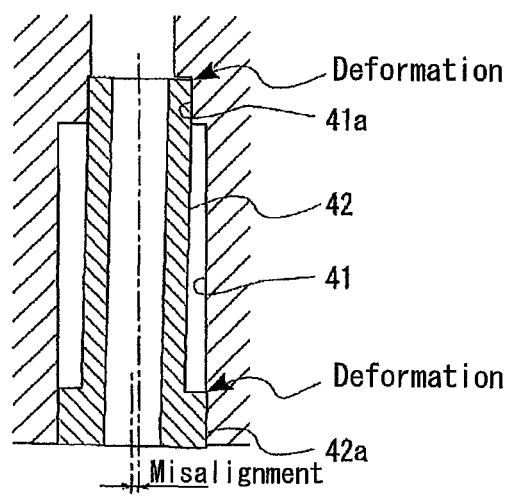
FIG. 7 is a diagram schematically indicating a press fitting of a passage forming member to which a triangle-shaped protrusion is not formed.
Figure 8:
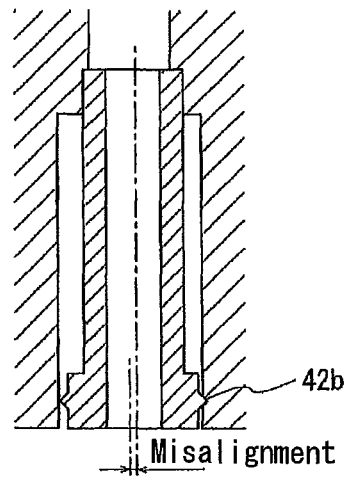
FIG. 8 is a diagram schematically indicating a press fitting of a passage forming member having a triangle-rectangular shaped protrusion.

As illustrated in FIG. 5, two triangle-shaped protrusions 42b are formed at the large diameter portion 42a at two locations. An upper slope of the triangle-shaped protrusion 42b is formed so as to have a relatively large angle relative to an axial line of the passage forming member 42, and a lower slope of the triangle-shaped protrusion 42b is formed so as to have a relatively small angle relative to the axial line of the passage forming member 42.

The passage forming member 42 is inserted into the inner bore 41 from the side of the reservoir 29 in such a way that the large diameter portion 42a of the passage forming member 42 is located so as to be close to the reservoir 29. More specifically, a top portion of the passage forming member 42 in an inserting direction fits the small diameter bore portion 41a of the inner bore 41, while the protrusions 42b fit the other end portion of the inner bore at the side of the passage forming member-switching valve communicating bore 43.

Because the passage forming member 42 is inserted into the inner bore 41 and fits therewithin at both end portions of the inner bore 41, in a case where both ends of the passage forming member 42 are formed in cylindrical shape, thereby an axis of the small diameter bore portion 41a of the inner bore 41 is not identical to an axis of the other end portion of the inner bore 41, a deformation on an inner circumferential surface of the inner bore 41 by each end portion of the passage forming member 42 occurs so that the passage forming member 42 can not fit into the inner bore 41. Even when the passage forming member 42 can fit into the inner bore 41 regardless of the deformation, sealingness of the extended ring-shaped passage may not be achieved. In a case where an axis of one end portion of the passage forming member 42 is not identical to that of the other end portion of the passage forming member 42, the deformation and less of sealing performance may occur. According to the embodiment, because the passage forming member 42 tangentially contacts the inner bore 41 at the protrusions 42b, a misalignment between the axis of the small diameter bore portion 41a (e.g., a small diameter portion) of the inner bore 41 and the axis of the other end portion of the inner bore 41 to which the large diameter portion 42a of the passage forming member 42 fits, or a misalignment between the axis of one end portion of the passage forming member 42 and the axis of the other end portion of the passage forming member 42, may be compensated, and in this configuration, an extended ring-shaped passage La1a may be surely formed with high sealing performance (e.g., liquid-tightly) between an outer circumferential surface of the passage forming member 42 and an inner circumferential surface of the inner bore 41.

Furthermore, because the housing 40 is made of aluminum alloy and the passage forming member 42 is made of carbon steel, the protrusions 42b may be fixed to the inner bore 41 in a manner where the protrusions 42b are cut into the inner circumferential surface of the inner bore 41 as illustrated in FIG. 5. In this embodiment, a length of a radially outer portion of the protrusions 42b being cut into the inner circumferential surface of the inner bore 41 is set to be longer, thereby improving a level of the sealing performance. Further, because the upper slope of the triangle-shaped protrusion 42b is formed so as to have the large angle relative to the axial line of the passage forming member 42, when the passage forming member 42 is inserted into the inner bore 41, the inner circumferential surface of the inner bore 41 may not be scratched by means of the protrusions 42b. Further, two protrusions 42b are formed in order to improve the sealing performance.

In this configuration, an extended ring-shaped passage La1a is formed between the outer circumferential surface of the passage forming member 42 and the inner circumferential surface of the inner bore 41 and between one end portion and the other end portion of the passage forming member 42. The extended ring-shaped passage La1a is a part of the first passage La1, which is a range corresponding to a range among the points T2, T3 and T4, enclosed by a dashed line in FIG. 1. As indicated in FIGS. 1, 3 and 4, the switching control valve 21, each of the pressure increase control valves 22 and 23 and the outlet valve 25 are connected to the extended ring-shaped passage La1a. Because the extended ring-shaped passage La1a is formed between the outer circumferential surface of the passage forming member 42 and the inner circumferential surface of the inner bore 41 in an extended ring shape (e.g., a tube shape), the above-mentioned control valves may be connected to the passage La1a in any connectable direction. Thus, a level of flexibility of the arrangements of the valves may be increased, thereby downsizing the housing. Within the passage forming member 42, a passage is formed between the point T1 on the second passage La1 and the switching valve 33, which is corresponding to a portion enclosed by a dashed line in FIG. 1. This passage within the passage forming member 42 is a part of the second passage, and as illustrated in FIGS. 1 and 3, one end of the passage within the passage forming member 42 is connected to the switching control valve 21 via the first passage, and the other end of the passage within the passage forming member 42 is connected to the switching valve 33. Thus, within the inner bore 41, at the inner and outer side of the passage forming member 42, the two passages are formed in the two layered structure so as not to be interfering a portion of the first passage with a portion of the second passage. Accordingly, there is no need to provide an additional space in order to form the first passage and the second passage so as not to be interfering each other, thereby downsizing the housing.

Within the housing 40, an outlet valve bore 25a is formed so as to be orthogonal to the inner bore 41 and extending toward the rotary pump 26 from the right side surface of the housing 40. The outlet valve 25 is fitted into the outlet valve bore 25a at a portion between the inner bore 41 and an outlet of the rotary pump 26. The outlet valve bore 25a includes an opening portion that opens to the side surface of the housing 40, and the opening portion of the outlet valve bore 25a is closed by a plug 51. Thus, the outlet valve 25 may be provided at a portion being closer to the outlet of the rotary pump 26 at a certain disused space, thereby achieving an effective utilization of the space within the housing 40.

Furthermore, because the outlet valve 25 is fitted into the outlet valve bore 25a at the side between the outlet of the rotary pump 26 and the inner bore 41, a high pressure from the master cylinder is applied to the outlet valve 25 at the side of the outlet of the rotary pump 26. Accordingly, the outlet valve 25 is structured so as to be in a so-called self sealing structure, and in this structure, a leak of the high pressure from the master cylinder may not occur.

An actuation of the control unit of the hydraulic brake B for the vehicle according to the embodiment will be explained. In a normal situation, the switching control valve 21 is in an opened state, the pressure increase control valves 22 and 23 are in opened states, the pressure decrease control valves 31 and 32 are in closed states, and the switching valve 33 is in a closed state, and when a driver depresses the brake pedal 11, the brake hydraulic pressure from the master cylinder 10 is directly transmitted to the wheel cylinders WCfl and WCrr so as to be in pressure increased states.

In a case when a braking slip amount of the left front wheel Wfl is increased, and a condition where an antiskid control is requested to the wheel cylinder WCfl is established, the pressure increase control valve 22 is switched to a closed state, at the same time the pressure decrease control valve 31 is switched to an opened state, and the electric motor 26a is started.

Then, the brake fluid flows from the wheel cylinder WCfl to the reservoir 29, accordingly, the wheel cylinder WCfl becomes a pressure reduced state. The brake fluid discharged from the wheel cylinder WCfl to the reservoir 29 via the pressure decrease control valve 31 is sucked by the rotary pump 26 and returned to passages between the switching control valve 21 and the pressure increase control valves 22 and 23 via the outlet valve 25. Furthermore, the brake fluid is further returned to the master cylinder 10 by means of the switching control valve 21.

In a case where the braking slip amount of the left front wheel Wfl is sufficiently reduced, the pressure decrease control valve 31 is switched to the closed state, and the pressure increase control valve 22 is switched to the opened state. Thus, the brake fluid is supplied to the wheel cylinder WCfl from the master cylinder in order to further increase the fluid pressure within the wheel cylinder WCfl. At the time when the braking slip amount of the left front wheel Wfl is changed so as to reach a slip range, the pressure increase control valve 22 is switched to the closed state in order to maintain the fluid pressure of the wheel cylinder WCfl.

As mentioned above, the control apparatus 60 controls the pressure increase control valve 22 and the pressure decrease control valve 31 so as to be in an opened state or a closed state in accordance with the braking slip amount of the left front wheel Wfl that is used to brake the vehicle, at the same time the rotary pump 26 is actuated by the electric motor 26a so that the fluid pressure within the wheel cylinder WCfl is adjusted to be in the decreased state, the further increased state or the maintaining state. By adjusting the fluid pressure of the wheel cylinder WCfl, a situation where the braking slip amount of the left front wheel Wfl that is used to brake the vehicle enters the slip range may be avoidable.

Next, a traction control for avoiding a situation where a slip amount of a wheel that is driven when the vehicle is started or the vehicle is accelerated (hereinafter simply referred to as a driving slip amount of the left front wheel) will be described. The vehicle mentioned here is a front-wheel drive type vehicle. When the vehicle is started or accelerated, generally the brake pedal 11 is not operated by the driver, and the switching control valve 21, the pressure increase control valves 22 and 23, the pressure decrease control valves 31 and 32 and the switching valve 33 are in normal states as illustrated in FIG. 1, and the electric motor 26a is stopped.

In this configuration, when the driving slip amount of the left front wheel Wfl is likely to be excessively increased, the control apparatus 60 switches the switching control valve 21 to the control position, and the switching valve 33 is switched to the opened state, and electric motor 26a is started in order to drive the rotary pump 26.

Thus, the rotary pump 26 sucks the brake fluid in the reservoir tank 12 by means of the inlet of the rotary pump 26 via the master cylinder 10 and the switching valve 33, and the rotary pump 26 increases the pressure of the brake fluid and then discharges the brake fluid from the outlet of the rotary pump 26. The discharged brake fluid is supplied to the wheel cylinder WCfl via the outlet valve 25 and the pressure increase control valve 22.

Thus, the pressure of the brake fluid within the wheel cylinder WCfl is increased, and the increase of the driving slip amount of the left front wheel Wfl is suppressed. Then, the control apparatus 60 controls an electric current supplied to a solenoid of the switching control valve 21, thereby adjusting the pressure of the brake fluid within the wheel cylinder WCfl, accordingly the driving slip amount of the left front wheel is appropriately adjusted.

Figure 9:
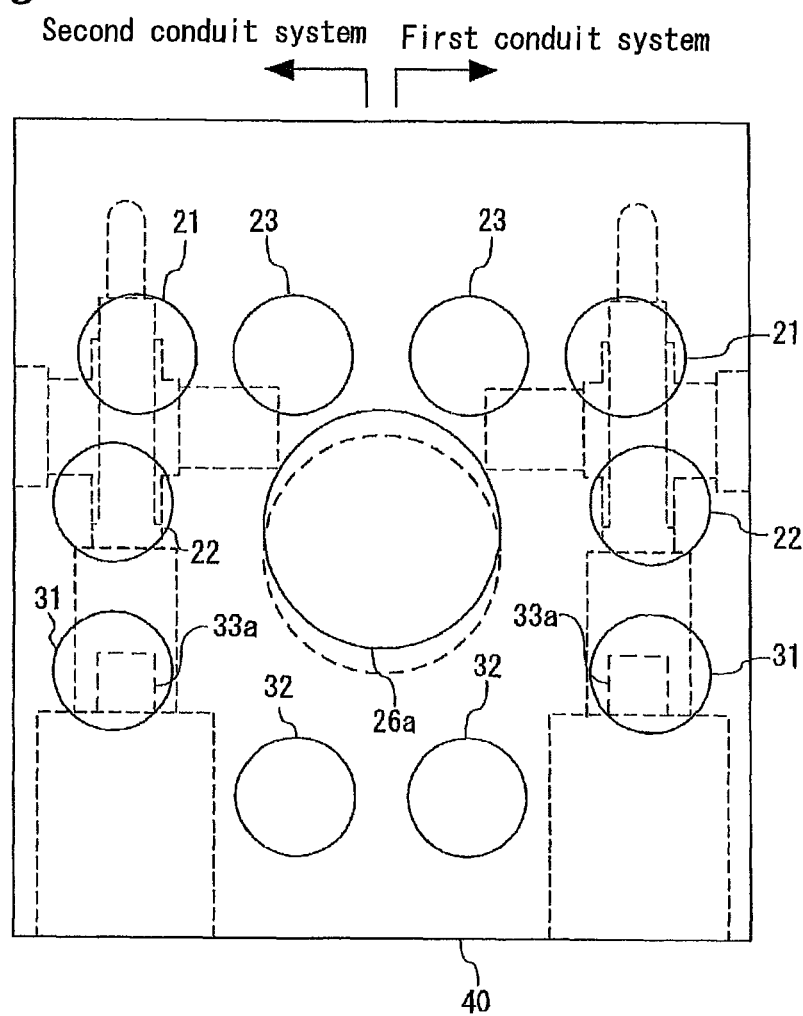
FIG. 9 is a front view schematically indicating a control unit of the hydraulic brake apparatus having a mechanically-operated switching valve.

The scope of this disclosure is not to be limited to the embodiment. For example, in the embodiment, an electromagnetic valve is used as the switching valve 33, however, a valve that is mechanically closed and opened when a fluid is supplied thereto from the master cylinder may be used as the switching valve 33a. The mechanically operated switching valve 33a may be housed in a switching valve housing bore formed at a portion between the passage forming member 42 and the reservoir 29 so that the switching valve housing bore and the reservoir 29 may be formed so as to be coaxial. In this configuration, the passage forming member-switching valve communicating bore 43 and the plug 52 illustrated in FIG. 3 may not be used. Furthermore, in this configuration in which the switching valve 33a is used, a portion where the switching valve 33 is provided in the housing 40 as illustrated in FIGS. 2 and 3 may be used by arranging the pressure decrease control valve 31 as illustrated in FIG. 9. Specifically, the pressure increase control valve 23 in the first conduit system, the pressure increase control valve 23 in the second conduit system, the switching control valve 21 in the first conduit system and the switching control valve 21 in the second conduit system are arranged above the rotary pump 26 in the front view of the housing 40, and the pressure decrease control valves 31 and 32 in the first conduit system and the pressure decrease control valves 31 and 32 in the second conduit system are provided below the rotary pump 26 in the front view of the housing 40. Further, the pressure increase control valve 22 in the first conduit system is provided at the right side of the rotary pump 26 in the front view of the housing 40, and the pressure increase control valve 22 in the second conduit system is provided at the left side of the rotary pump 26 in the front view of the housing 40. In this configuration, the control unit of the hydraulic brake apparatus for the vehicle may further be downsized.

The passage within the passage forming member is the part of the second passage, and the part of the first passage is formed between the outer circumferential surface of the passage forming member and the inner circumferential surface of the inner bore. Because the two passages are formed in the two layered structure so as not to be interfering each other (not interfering the portion of the first passage with the portion of the second passage), there is no need to provide an additional space in order to form the first passage and the second passage so as not to be interfering each other, thereby downsizing the housing. Further, because the extended ring-shaped passage that is the part of the first passage is formed between the outer circumferential surface of the passage forming member and the inner circumferential surface of the inner bore in an extended ring shape (e.g., a tube shape), the abovementioned control valves may be connected to the extended ring-shaped passage in any connectable direction. Thus, a level of flexibility of the arrangements of the valves may be increased, thereby downsizing the housing.

According to this disclosure, the passage forming member is formed in a tube shape and is press-fitted into the inner bore at the both end portions of the passage forming member so that the inner bore is liquid-tightly sealed by the both end portions of the passage forming member in order to form the extended ring-shaped passage.

Thus, the extended ring-shaped passage is formed in a simple structure by setting the passage forming member within the housing so as to be fitted into the inner bore, and the extended ring-shaped passage is sealed by means of the passage forming member. In this configuration, there is no need to provide an additional member such as a sealing member for sealing the extended ring-shaped passage, thereby reducing manufacturing costs of the control unit of the hydraulic brake apparatus.

According to this disclosure, the inner bore and the reservoir are formed so as to be overlapping each other in a plane orthogonal to an axial direction of the inner bore, and the switching valve is connected to a portion formed between the reservoir and one end of the passage forming member at the side of the reservoir.

Thus, because the inner bore and the reservoir are arranged in a straight line in an axial direction of the inner bore, a process for forming the control unit may be simplified, and the manufacturing costs of the control unit may further be reduced. Further, because the switching valve is provided at the portion formed between the reservoir and one end of the passage forming member at the side of the reservoir, a length of the second passage may be shortened, thereby achieving effective use of the space within the housing. In a configuration where the mechanically operated (opened and closed) switching valve is used, the inner bore, the housing bore for the switching valve and the reservoir may be arranged in a straight line, thereby further downsizing the control unit.

According to this disclosure, the inner bore includes a small diameter portion at the side where the reservoir is not provided, and one end portion of the passage forming member is press-fitted into the small diameter portion of the inner bore, the passage forming member includes a large diameter portion at which a protrusion is circularly formed on a outer circumferential surface of the large diameter portion, the protrusion having a triangle shaped-cross section seen in a plane including a axial line of the passage forming member, and the other end portion of the passage forming member is press-fitted into the inner bore at the protrusion of the large diameter portion.

Because the passage forming member is inserted into the inner bore and fits therewithin at both end portions of the inner bore, in a case where both ends of the passage forming member are formed in cylindrical shape, thereby an axis of the small diameter bore portion of the inner bore is not identical to an axis of the other end portion of the inner bore, a deformation on an inner circumferential surface of the inner bore by each end portion of the passage forming member occurs so that the passage forming member can not fit into the inner bore. Even when the passage forming member can fit into the inner bore regardless of the deformation, sealingness of the extended ring-shaped passage may not be achieved. In a case where an axis of one end portion of the passage forming member is not identical to that of the other end portion of the passage forming member, the deformation and less of sealing performance may occur. According to the embodiment, because the passage forming member tangentially contacts the inner bore at the protrusions, a misalignment between the axis of the small diameter bore portion (e.g., a small diameter portion) of the inner bore and the axis of the other end portion of the inner bore to which the large diameter portion of the passage forming member fits, or a misalignment between the axis of one end portion of the passage forming member and the axis of the other end portion of the passage forming member, may be compensated, and in this configuration, an extended ring-shaped passage La1a may be surely formed with high sealing performance (e.g., liquid-tightly) between an outer circumferential surface of the passage forming member and an inner circumferential surface of the inner bore.

According to this disclosure, the outlet valve is fitted into an outlet valve bore at a portion between the inner bore and an outlet of the rotary pump, the outlet valve bore is formed so as to intersect with the inner bore and to extend from a side surface of the housing, the outlet valve bore includes an opening portion that opens toward the outside of the housing at the side surface of the housing, and the opening portion of the outlet valve bore is sealed by a plug.

Because the outlet valve is fitted into the outlet valve bore at the portion closer to the outlet of the rotary pump, a high pressure from the master cylinder is applied to the outlet valve at the side of the outlet of the rotary pump, while downsizing the housing. Accordingly, the outlet valve is structured so as to be in a so-called self sealing structure, and in this structure, a leak of the high pressure from the master cylinder may not occur.

According to this disclosure, the control unit is configured by a first conduit system and a second conduit system, each of which includes two said pressure increase control valves, the switching control valve, and two said pressure decrease control valve, and in each of the first and second conduit systems, one of the two said pressure increase control valves is arranged above the rotary pump in a front view of the housing, the switching control valve is arranged above the rotary pump in the front view of the housing, the two said pressure decrease control valves are arranged below the rotary pump in the front view of the housing, and the other of the two said pressure increase control valves is arranged at the right or the left of the rotary pump in the front view of the housing, where each of the valves being set form a front of the housing.

Thus, because the pressure decrease control valves are arranged at a portion below the rotary pump within the housing, the pressure increase control valves and the switching control valves are aligned so as to form one layer, which leads to a downsizing of the housing in a height direction thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control unit of a hydraulic brake apparatus for a vehicle including a housing provided between a master cylinder and a plurality of wheel cylinders; the control unit comprising: within the housing,
   a switching control valve provided at a first passage connected to the master cylinder;
   pressure increase control valves, one of which provided in one passage branched from the first passage and the other of which provided in the other passage branched from the first passage;
   pressure decrease control valves, one of which connected to one of the pressure increase control valves at the side of the wheel cylinders, and the other of which connected to the other of the pressure increase control valves at the side of the wheel cylinders;
   a reservoir connected to the pressure decrease control valves;
   a pump driven by a motor so as to suck a brake fluid from the reservoir and to discharge the brake fluid by way of an outlet valve to a portion between the switching control valve and the pressure increase control valves;
   a second passage arranged in such a way that one end of the second passage is connected to the switching control valve at the side of the master cylinder and the other end of the second passage is connected to the reservoir, the second passage being controlled so as to be communicated or interrupted by means of a switching valve;
   an inner bore formed within the housing; and
   a passage forming member being liquid-tightly fitted into the inner bore at both end portions of the passage forming member in order to form an extended ring-shaped passage between an outer circumferential surface of the passage forming member and an inner circumferential surface of the inner bore and between both end portions of the passage forming member, wherein the extended ring-shaped passage forms a part of the first passage, and each of the switching control valve, the pressure increase control valves and the outlet valve is connected to the extended ring-shaped passage, a part of the second passage is formed within the passage forming member, one end portion of the part of the second passage formed within the passage forming member is connected to the switching control valve at the side of the master cylinder, and the other end portion of the part of the second passage formed within the passage forming member is connected to the switching valve.

2. The control unit of the hydraulic brake apparatus for the vehicle according to claim 1, wherein the passage forming member is formed in a tube shape and is press-fitted into the inner bore at the both end portions of the passage forming member so that the inner bore is liquid-tightly sealed by the both end portions of the passage forming member in order to form the extended ring-shaped passage.

3. The control unit of the hydraulic brake apparatus for the vehicle according to claim 2, wherein the inner bore and the reservoir are formed so as to be overlapping each other in a plane orthogonal to an axial direction of the inner bore, and the switching valve is connected to a portion formed between the reservoir and one end of the passage forming member at the side of the reservoir.

4. The control unit of the hydraulic brake apparatus for the vehicle according to claim 2, wherein the inner bore includes a small diameter portion at the side where the reservoir is not provided, and one end portion of the passage forming member is press-fitted into the small diameter portion of the inner bore, the passage forming member includes a large diameter portion at which a protrusion is circularly formed on a outer circumferential surface of the large diameter portion, the protrusion having a triangle shaped-cross section seen in a plane including a axial line of the passage forming member, and the other end portion of the passage forming member is press-fitted into the inner bore at the protrusion of the large diameter portion.

5. The control unit of the hydraulic brake apparatus for the vehicle according to claim 1, wherein the inner bore and the reservoir are formed so as to be overlapping each other in a plane orthogonal to an axial direction of the inner bore, and the switching valve is connected to a portion formed between the reservoir and one end of the passage forming member at the side of the reservoir.

6. The control unit of the hydraulic brake apparatus for the vehicle according to claim 5, wherein the inner bore includes a small diameter portion at the side where the reservoir is not provided, and one end portion of the passage forming member is press-fitted into the small diameter portion of the inner bore, the passage forming member includes a large diameter portion at which a protrusion is circularly formed on a outer circumferential surface of the large diameter portion, the protrusion having a triangle shaped-cross section seen in a plane including a axial line of the passage forming member, and the other end portion of the passage forming member is press-fitted into the inner bore at the protrusion of the large diameter portion.

7. The control unit of the hydraulic brake apparatus for the vehicle according to claim 1, wherein the outlet valve is fitted into an outlet valve bore at a portion between the inner bore and an outlet of the pump, the outlet valve bore is formed so as to intersect with the inner bore and to extend from a side surface of the housing, the outlet valve bore includes an opening portion that opens toward the outside of the housing at the side surface of the housing, and the opening portion of the outlet valve bore is sealed by a plug.

8. The control unit of the hydraulic brake apparatus for the vehicle according to claim 1, wherein the pump is constructed of a rotary pump, and wherein the control unit is configured by a first conduit system and a second conduit system, each of which includes two said pressure increase control valves, the switching control valve, and two said pressure decrease control valve, and in each of the first and second conduit systems, one of the two said pressure increase control valves is arranged above the rotary pump in a first surface of the housing, the switching control valve is arranged above the rotary pump in the first surface of the housing, the two said pressure decrease control valves are arranged below the rotary pump in the first surface of the housing, and the other of the two said pressure increase control valves is arranged at the right or the left of the rotary pump in the first surface of the housing, where the first surface is set opposite to a surface on which the rotary pump is set.

* * * * *